(12) United States Patent
Smith

(10) Patent No.: US 9,707,665 B1
(45) Date of Patent: Jul. 18, 2017

(54) LOG VICE

(71) Applicant: Brian D. Smith, Montrose, CO (US)

(72) Inventor: Brian D. Smith, Montrose, CO (US)

( * ) Notice: Subject to any disclaimer, the term of this patent is extended or adjusted under 35 U.S.C. 154(b) by 302 days.

(21) Appl. No.: 14/468,065

(22) Filed: Aug. 25, 2014

Related U.S. Application Data

(60) Provisional application No. 61/870,516, filed on Aug. 27, 2013.

(51) Int. Cl.
| | | |
|---|---|---|
| *B25B 1/02* | (2006.01) | |
| *B27B 17/00* | (2006.01) | |
| *B25B 1/24* | (2006.01) | |
| *B60D 1/58* | (2006.01) | |
| *B60R 11/00* | (2006.01) | |

(52) U.S. Cl.
CPC ............... *B25B 1/02* (2013.01); *B25B 1/241* (2013.01); *B27B 17/0075* (2013.01); *B60D 1/58* (2013.01); *B60R 11/00* (2013.01); *B60R 2011/004* (2013.01); *B60R 2011/0084* (2013.01)

(58) Field of Classification Search
USPC ................................... 269/99, 100, 296, 902
See application file for complete search history.

(56) References Cited

U.S. PATENT DOCUMENTS

| | | | | |
|---|---|---|---|---|
| 4,468,018 A | * | 8/1984 | Vaizey | ................ B27B 17/0075 269/166 |
| 4,718,652 A | | 1/1988 | Liebenstein | |
| 5,472,180 A | * | 12/1995 | Bent | ................... B27B 17/0075 269/254 CS |
| 5,678,811 A | * | 10/1997 | Johnson | .................... B25B 5/10 211/49.1 |
| 2010/0156018 A1 | | 6/2010 | Maire | |
| 2011/0139845 A1 | | 6/2011 | Rath et al. | |
| 2013/0328257 A1 | * | 12/2013 | Martin | .................... B25B 1/205 269/97 |

* cited by examiner

*Primary Examiner* — Joseph J Hail
*Assistant Examiner* — Shantese McDonald
(74) *Attorney, Agent, or Firm* — Stevenson IP, LLC

(57) ABSTRACT

A log vice providing a partially disassembable stand alone log vice and a trailer hitch attachable log vice that have an upper support member that telescopically engages the upright member, a pair of V-shaped upper and lower vice arms with teeth attached to the outer ends of the respective upper and lower vice arms such that the vice arm teeth approach and retract from each other in accommodating the various diameter logs, and a pair of separate braces adding structural integrity to the upright member and the lower vice arm. The trailer hitch log vice also includes a hollow lower horizontal member removably attachable to a vehicle receiver hitch, while the stand alone log vice has a support stand member.

13 Claims, 7 Drawing Sheets

LOG VICE

CROSS-REFERENCE TO RELATED APPLICATIONS

U.S. Provisional Application No. 61/870,516 Filed Aug. 8, 2013

FEDERALLY SPONSORED RESEARCH OR DEVELOPMENT

Not Applicable

INCORPORATION BY REFERENCE OF MATERIAL SUBMITTED ON A COMPACT DISK

Not Applicable

BACKGROUND OF THE INVENTION

Various types of wood bucks designed to removably hold logs to be cut are known in the prior art. However, what is needed is a log vice that removably attaches to a vehicle receiver hitch and also provides for stand alone use, that is adjustable to accommodate logs of varying diameters to be cut, that includes structural features that prevent logs from slipping out of the log vice, that can be capable of partial disassembly, and that is reinforced for strength.

FIELD OF THE INVENTION

The present invention relates to wood bucks, and more particularly, to a log vice for stand alone use configured to partial disassemble or trailer hitch use including a hollow lower horizontal member removably attachable to a vehicle receiver hitch. The log vice includes an upright member with a support brace therebetween, an upper support member that telescopically engages the upright member to accommodate logs of varying diameters to be cut, an upper arm and a lower arm that are parallel to each other and are perpendicular to the respective upper support member and upright member to which they are attached, V-shaped upper and lower vice arms with teeth attached to the outer ends of the respective upper and lower arms, a support brace disposed between the lower horizontal member and the upright member, and an upper brace between the upright member and the lower arm.

SUMMARY OF THE INVENTION

The general purpose of the present log vice, described subsequently in greater detail, is to provide a log vice which has many novel features that result in a log vice which is not anticipated, rendered obvious, suggested, or even implied by prior art, either alone or in combination thereof.

To accomplish this, the log vice is provided as a stand alone log vice and also a trailer hitch log vice that is hitched to a vehicle. The trailer hitch log vice includes a hollow lower horizontal member that is removably attachable to an extant receiver hitch of the vehicle. The hollow lower horizontal member has an inside end that is inserted into a receiver hitch of the trailer hitch, an outside end, and a top side.

The log device suitable for trailer hitch attachment includes an upright member having an internal cavity having a continuous outer wall comprising a rear member side spaced apart from a front member side, a top member side spaced apart from a bottom side, and a left side spaced apart from a right side. A plurality of spaced apart apertures is disposed in the rear member side proximal the top member side. An upper support member has a first end spaced apart from a second end. The upper support member is slidably engaged with the top member side.

A support brace includes an upper end spaced apart from a lower end. The upper end is disposed on the rear member side proximal an upright member approximate center. The support brace is at an approximate 45 degree angle to the front member side.

A plurality of spaced apart apertures is disposed proximal the first end, the first end apertures facing the top member side apertures. A spring loaded pin selectively secures one of the first end apertures to one of the top member side apertures. An upper arm comprises a proximal end spaced apart from a distal end. The proximal end is affixed perpendicularly to the second end in a position 90 degrees opposite the lower horizontal member relative to the upright member. A lower arm comprises an internal end spaced apart from an external end. The lower arm is approximately perpendicularly and disposed on the front member side in a position parallel to the upper arm. The lower arm has a length greater than a length of the upper arm.

A V-shaped upper vice arm having a central apex disposed on the distal end. A pair of first extensions is provided. One of each first extension is disposed on each of a side of the central apex. Each of the first extensions is angularly directed toward the lower horizontal member. An elevated section, which can have a height of approximately 2 inches or otherwise as needed to elevate the arm center apex to a height commensurate with the structure and function of the present device, is disposed atop the external end. A V-shaped lower vice arm, which has an arm center apex, is centrally disposed on the elevated section. The elevated section is configured to dispose the arm center apex closer to the upper vice arm than if the elevated section were absent. A pair of spaced apart second extensions is disposed on each of a side of the arm center apex. The second extensions are angularly directed toward the upper vice arm. The first extensions and the second extensions disposed in a mirror image configuration, wherein each of the first and second extensions are directed toward each other at an approximate 45-degree angle the respective central apex and arm center apex. A plurality of teeth is disposed on each of the first extensions, on the second extensions, and on the central apex. The teeth of the upper vice arm substantially face the lower vice arm. Each of the teeth of a first set of the teeth of each of the first and second extensions is directed toward a vertical midline axis between the central apex and the arm center apex. Each of the teeth of the second set of the teeth is directed toward the arm center apex.

The stand alone log vice comprises a hollow support stand member extended from the rear member side of the upright member, rather than the front member side. The support stand member has spaced-apart stand ends. The hollow support stand member further comprises an upper side and a frontal side. The hollow support stand member has a length longer than a length of each of the upper arm and the lower arm.

Each of the trailer hitch log vice and the stand alone log vice provides an upper brace between the upright member and the lower arm. An aperture is disposed in opposite each of a right angle member on the lower horizontal member and the lower support stand member in the stand alone version. The apertures are configured to provide for anchoring the right angle member to various objects and surfaces to secure the stand alone log vice to a surface.

Thus has been broadly outlined the more important features of the present log vice so that the detailed description thereof that follows may be better understood and in order that the present contribution to the art may be better appreciated.

BRIEF DESCRIPTION OF THE DRAWINGS

Figures

DETAILED DESCRIPTION OF THE DRAWINGS

Figure 1:
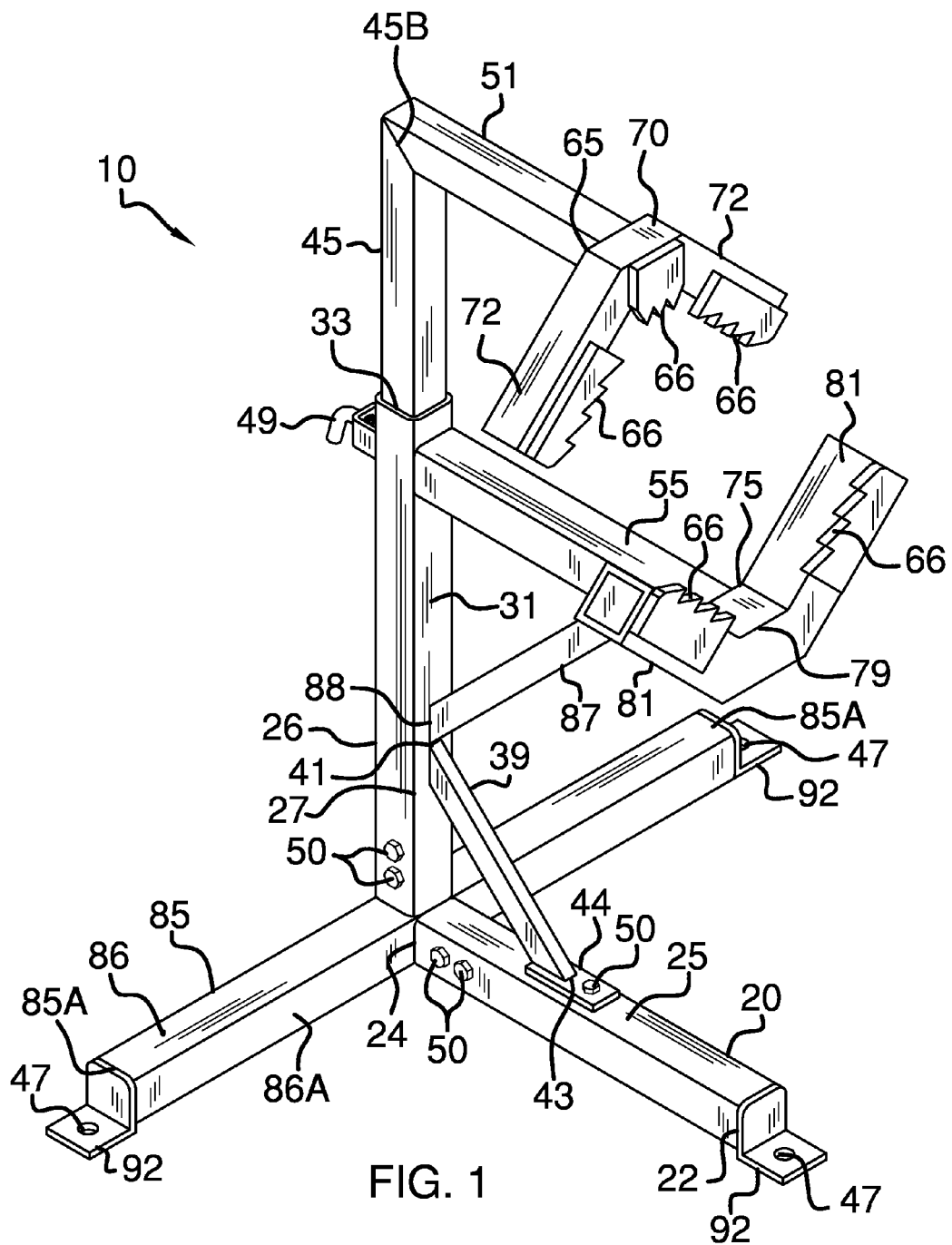
FIG. 1 is a right side perspective view of a stand alone log vice.
Figure 2:
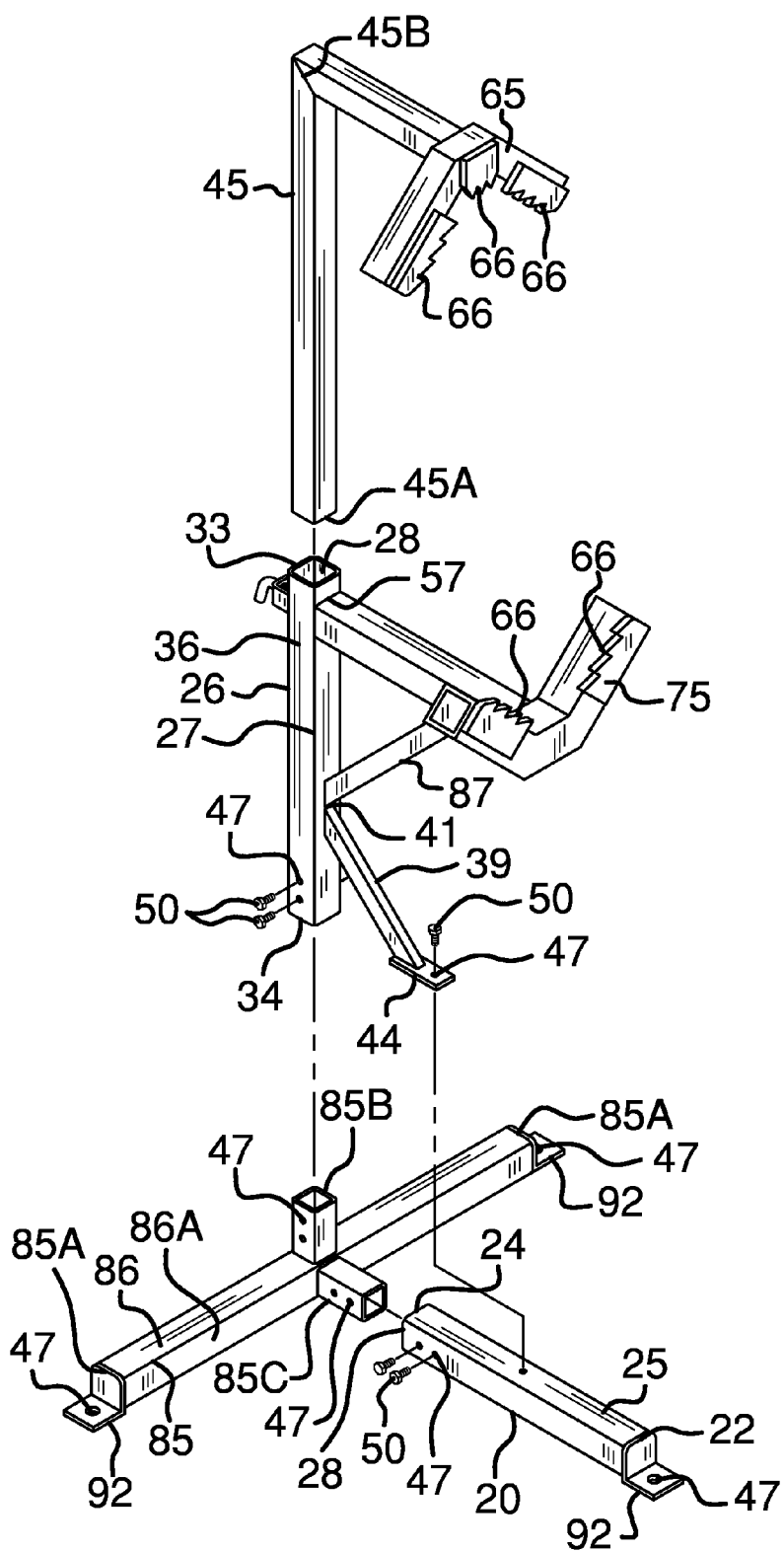
FIG. 2 is an exploded right side perspective view of the stand alone log vice.
Figure 3:
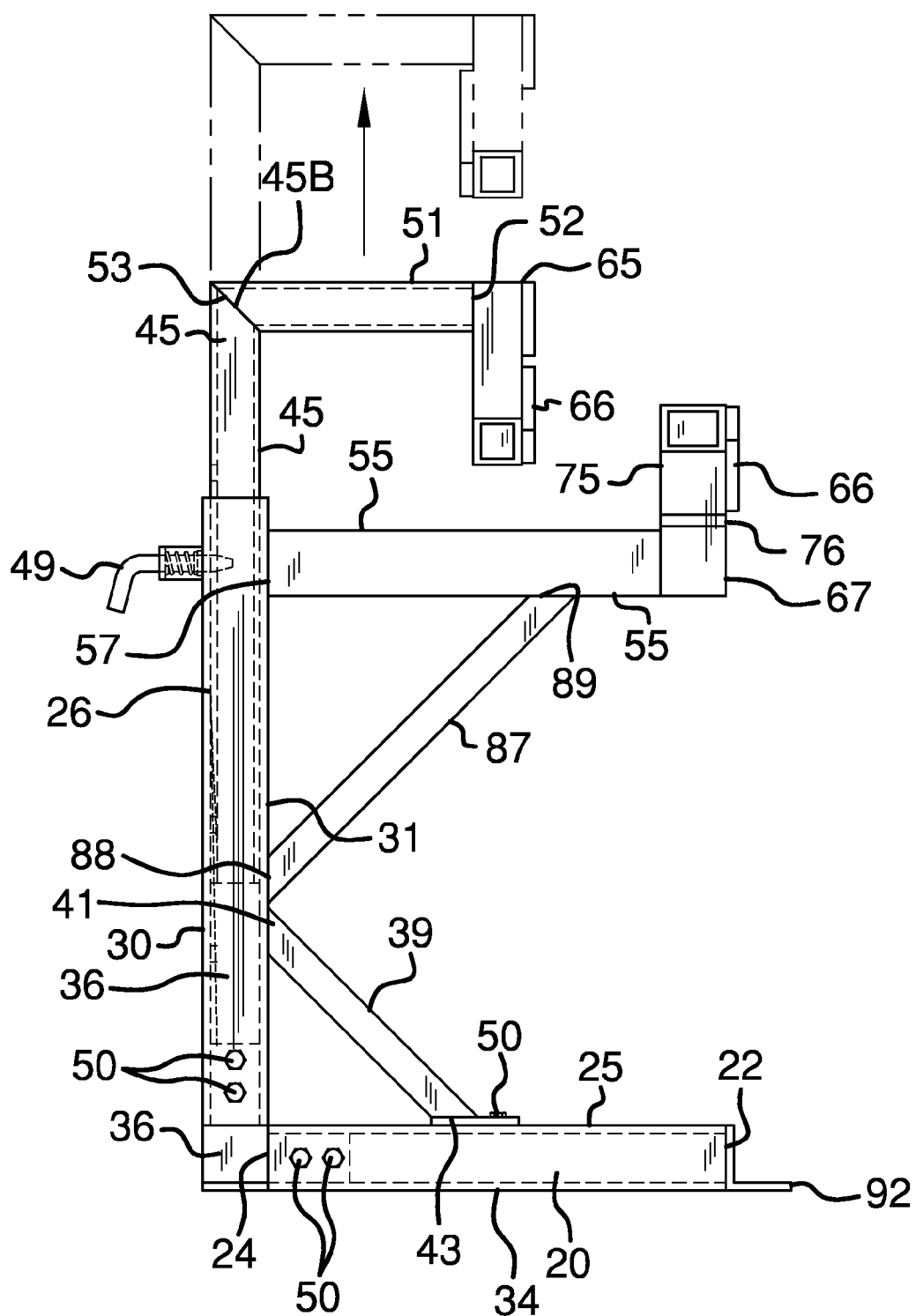
FIG. 3 is a right side elevation view of the stand alone log vice.
Figure 4:
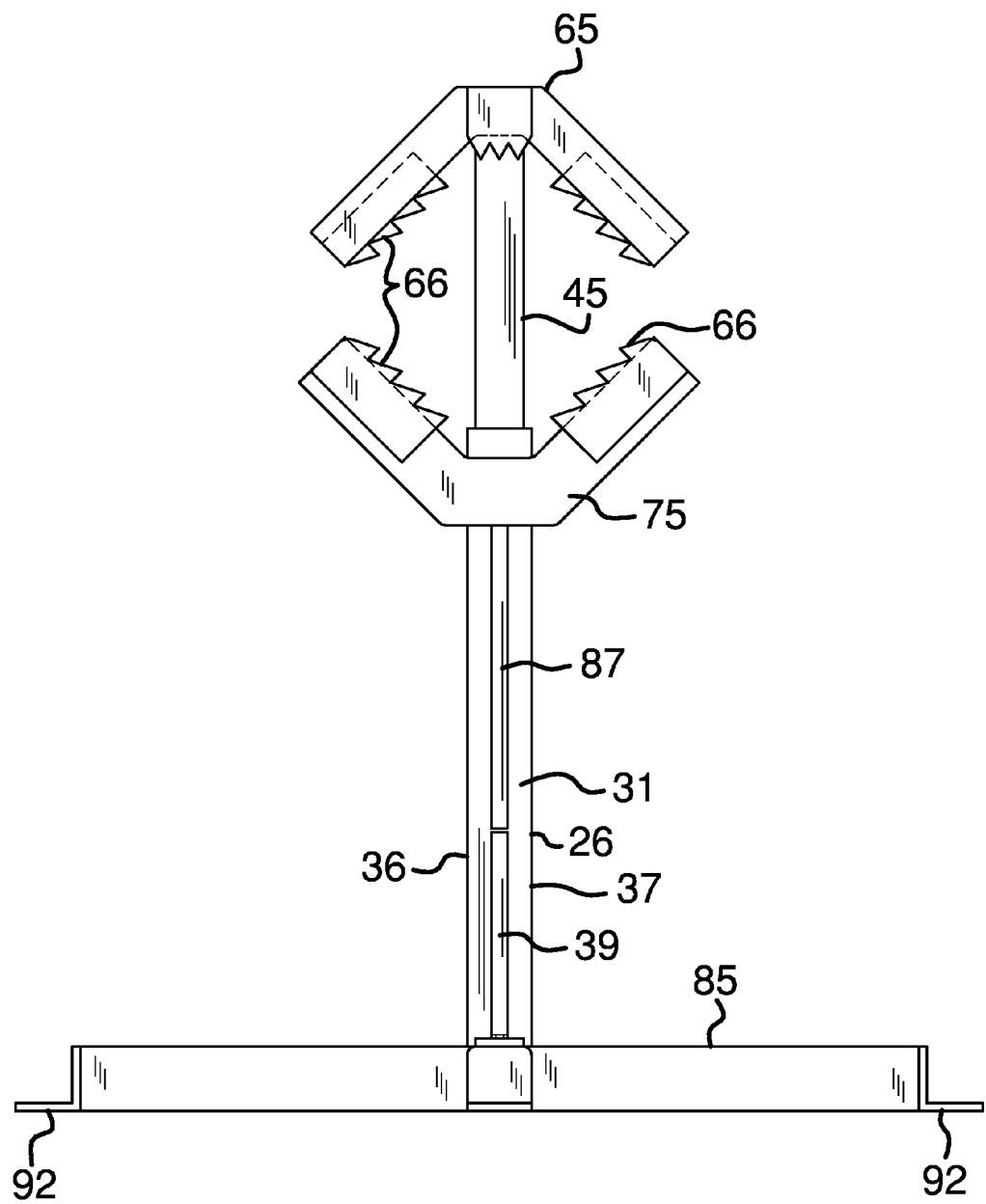
FIG. 4 is a front member side elevation view of the stand alone log vice.
Figure 5:
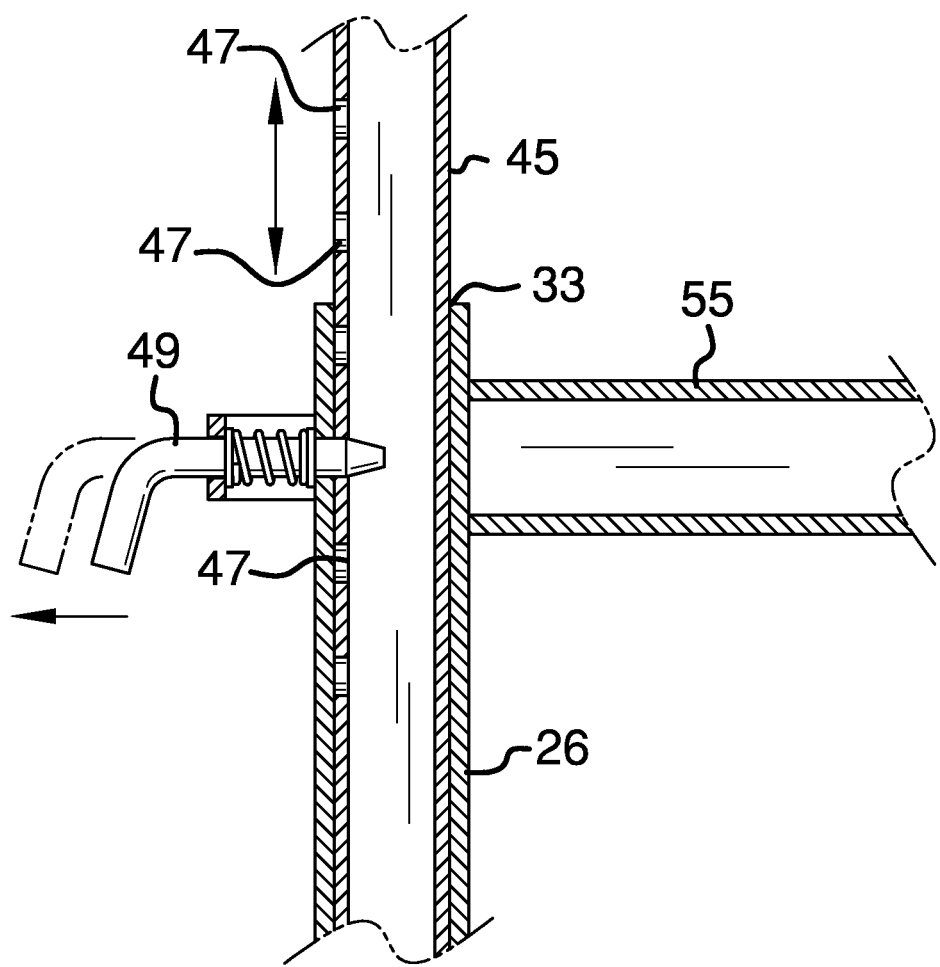
FIG. 5 is a cross sectional view of a telescopic fit of an upper support member within an upright member.
Figure 6:
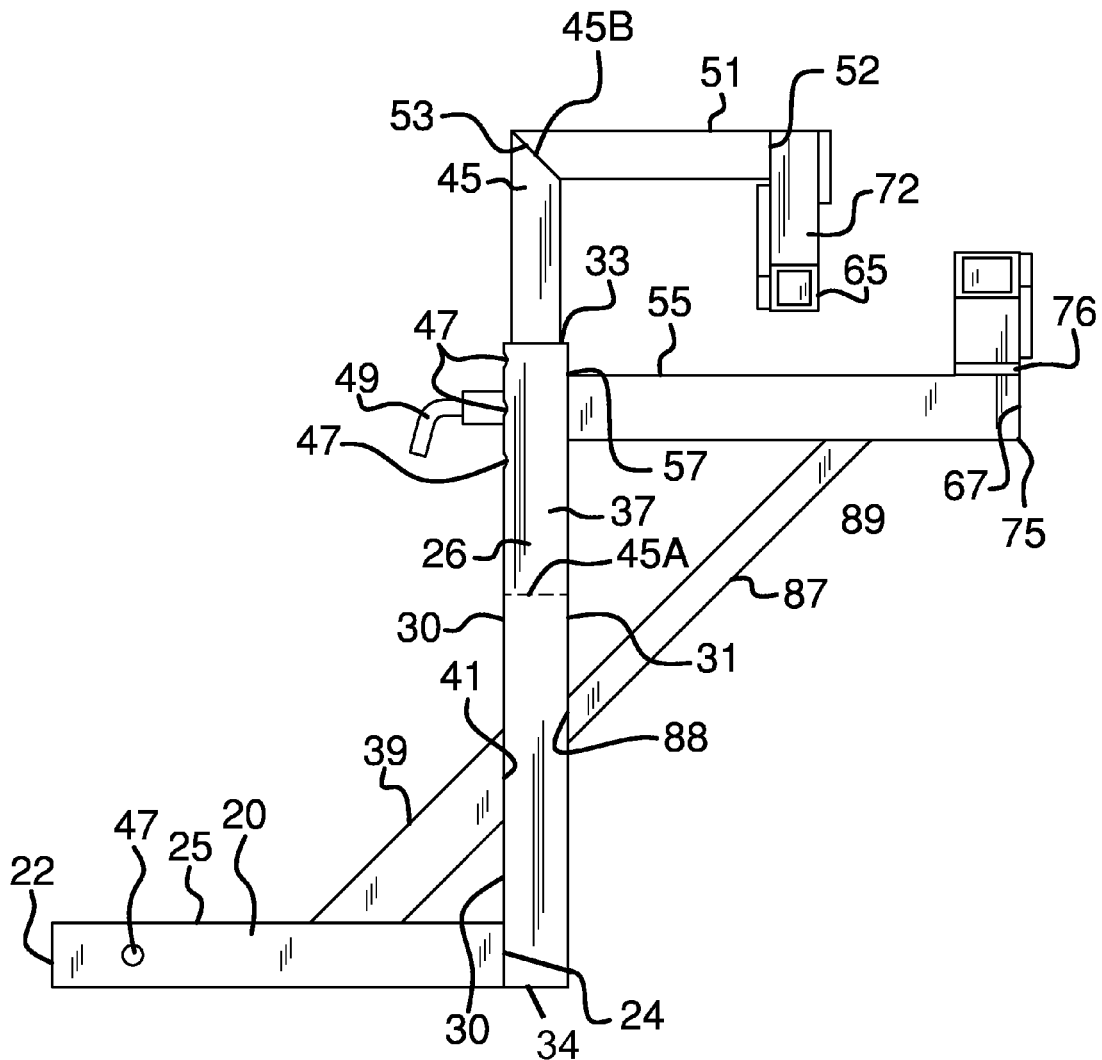
FIG. 6 is a left side elevation view of a trailer hitch log vice.
Figure 7:
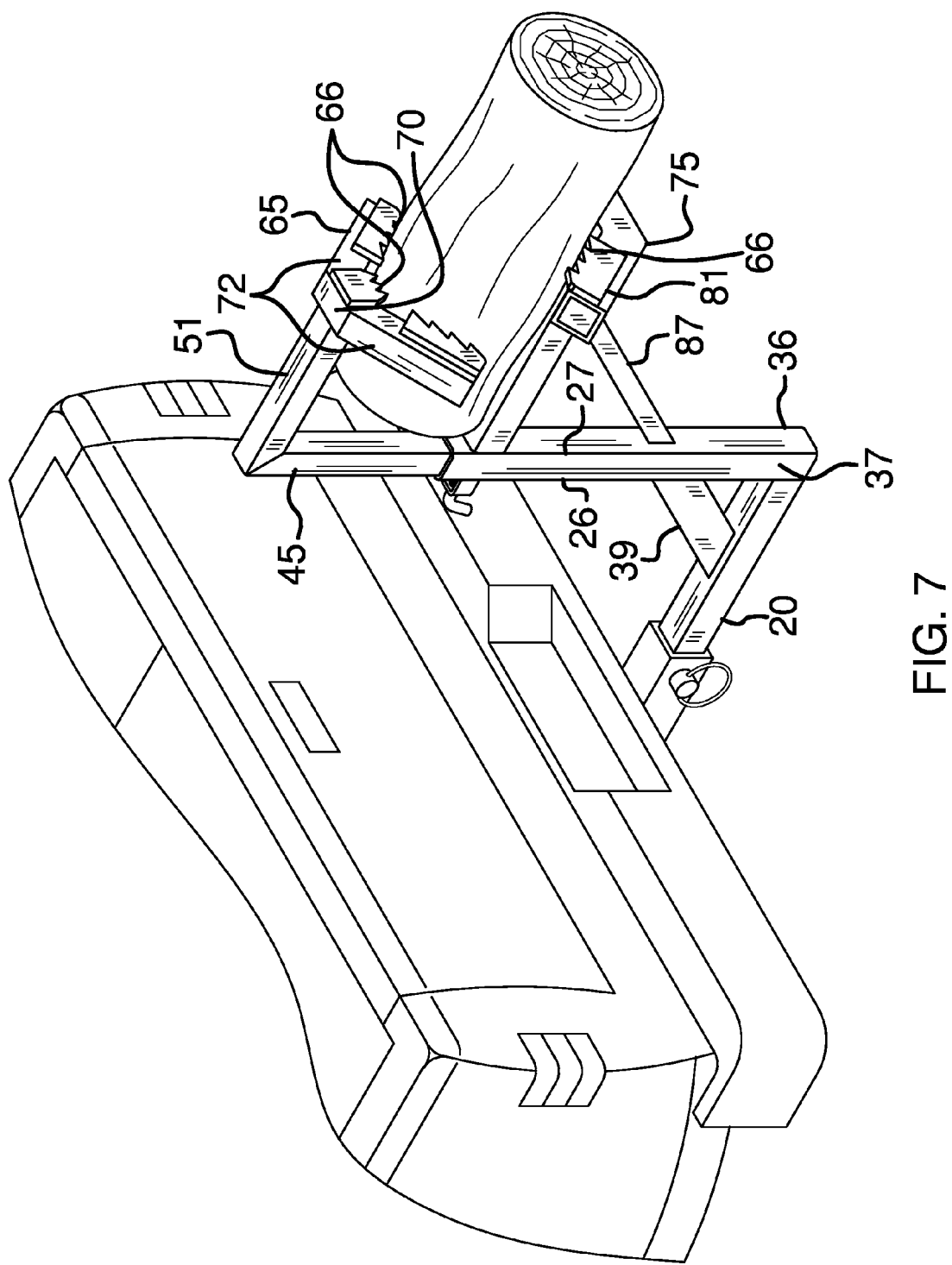
FIG. 7 is an in-use perspective view of the trailer hitch log vice.

With reference now to the drawings, and in particular FIGS. 1 through 7 thereof, examples of the instant log vice employing the principles and concepts of the present log vice and generally designated by the reference number 10 will be described.

The log vice 10 is provided as a stand alone log vice 10 and also a trailer hitch log vice 10 that is hitched to an extant vehicle via an extant receiver hitch.

The stand alone log vice 10 comprises a hollow lower horizontal member 20 having an inside end 22 spaced apart from an outside end 24, and a top side 25. An upright member 26 is disposed on the lower horizontal member 20. The upright member 26 has an internal cavity 28, and a continuous outer wall 27, the outer wall 27 having a rear member side 30 spaced apart from a front member side 31, a top member side 33 spaced apart from a bottom side 34, and a left side 37 spaced apart from a right side 36. An upper support member 45 has a first end 45A spaced apart from a second end 45B. The upper support member 45 slidably engages the internal cavity 28 through the top member side 33 of the upright member 26.

A plurality of spaced apart apertures 47 is provided. A first set of the apertures 47 is disposed in each of the upper support member 45 proximal the first end 45A and in the rear member side 30 proximal the top member side 33. The apertures 47 are disposed in the first end 45A facing the apertures 47 in the rear member side 30. A spring loaded pin 49 selectively secures one of the apertures 47 in the first end 45A to one of the apertures 47 in the rear member side 30. An upper arm 51 has a proximal end 53 spaced apart from a distal end 52. The proximal end 53 is affixed perpendicularly to the second end 45B. A lower arm 55 has an internal end 57 spaced apart from an external end 67. The lower arm 55 is substantially perpendicularly and disposed on the front member side 31 in a position parallel to the upper arm 51. The lower arm 55 has a length greater than a length of the upper arm 51. An elevated section 76 is disposed atop the lower arm 55 at the external end 67.

A V-shaped upper vice arm 65 has a central apex 70 having a pair of first extensions 72. One of each first extension 72 is disposed on each of a side of the central apex 72. Each of the first extensions 72 is angularly directed toward the lower horizontal member 20. V-shaped lower vice arm 75 partially comprises an arm center apex 79 centrally disposed on the elevated section 76. A pair of spaced apart second extensions 81 is disposed on each of a side of the arm center apex 79. The first extensions 72 and the second extensions 81 are disposed in a mirror image configuration. A plurality of teeth 6 is provided. A first set of the teeth 66 is disposed on each of the first extensions 72 and the second extensions 81. A second set of the teeth 66 is disposed on the central apex 70 in a position directed toward the lower arm 55. Each of the first extensions 72 and second extensions 81 are directed toward each other at an approximate 45-degree angle of the respective central apex 70 and the arm center apex 79. Each of the teeth 66 of the first set of the teeth 66 of each of the first extensions 72 and second extensions 81 is directed toward a vertical midline axis between the central apex 70 and the arm center apex 79, and wherein each of the teeth 66 of the second set of the teeth 66 is directed toward the arm center apex. The lower horizontal member 20 has a length longer than a length of each of the upper arm 51 and the lower arm 55.

A support stand member 85 has an upper side 86 and a frontal side 86A. A support brace 39 is disposed between the lower horizontal member 20 and the upright member 26 proximal the outside end 24. An upper brace 87 is disposed between the upright member 26 and the lower arm 55. A vertical post 85B is disposed on the upper side 86 of the support stand member 85. A horizontal post 85C is disposed on the frontal side 86A of the support stand member 85. A right angle member 92 is disposed on each of a pair of stand ends 85A of the support stand member 85 and on the inside end 22 of the lower horizontal member 20.

A second set of the apertures 47 is provided wherein one of the apertures 47 of the second set of apertures 47 is disposed in each right angle member 92. A plate 44 is disposed on the lower end 43. A fastener 50 secures the plate 44 to the top side 25 of the lower horizontal member 20. The outside end 24 is separable from the upright member 26. The upright member 26 is selectively attachable to the top side 25. The outside end 24 is attachable to the frontal side 86A, wherein each of the upright member 26 and the lower horizontal member 20 is separable from the support stand member 85. The upright member 26 removably slidably engages the vertical post 85B. The lower horizontal member 20 removably slidably engages the horizontal post 85C.

The log vice 10 used with the extant receiver hitch comprises a hollow lower horizontal member 20 having an inside end 22 spaced apart from an outside end 24, and a top side 25. An upright member 26 is abutted to and disposed on the outside end 24. The upright member 26 has an internal cavity 27 surrounded by a continuous outer wall 27. The outer wall 27 has a rear member side 30 spaced apart from a front member side 31, a top member side 33 spaced apart from a bottom side 34, and a left side 37 spaced apart from a right side 36. A upper support member 45 has a first end 45A spaced apart from a second end 45B. The upper support member 45 slidably engages the internal cavity 28 through the top member side 33 of the upright member 26.

A plurality of spaced apart apertures 47 is provided. A first set of the apertures 47 is disposed in each of the upper support member 45 proximal the first end 45A and in the rear member side 30 proximal the top member side 33. The apertures 47 are disposed in the first end 45A facing the apertures 47 in the rear member side 30. A spring loaded pin 49 selectively secures one of the apertures 47 in the first end 45A to one of the apertures 47 in the rear member side 30.

An upper arm 51 has a proximal end 53 spaced apart from a distal end 52. The proximal end 53 is affixed perpendicularly to a second end 45B of the upper support member 45. A lower arm 55 has an internal end 57 spaced apart from an external end 67. The lower arm 55 is substantially perpendicularly and centrally disposed on the front member side 31 in a position parallel to the upper arm 51. The lower arm 55 has a length greater than a length of the upper arm 51. An elevated section 76 is disposed atop the lower arm 55 at the external end 67. A V-shaped upper vice arm 65 has a central apex 70 and a pair of first extensions 72. One of each first extension 72 is disposed on each of a side of the central apex 70.

A V-shaped lower vice arm 75 partially comprises an arm center apex 79 centrally disposed on the elevated section 76. A pair of spaced apart second extensions 81 is disposed on each of a side of the arm center apex 79. The first extensions 72 and the second extensions 81 are disposed in a mirror image configuration. Each of the first extensions 72 is angularly directed toward the lower arm 55. Each of the second extensions 81 is angularly directed toward the upper arm 51. A plurality of teeth 66 is provided. A first set of the teeth 66 is disposed on each of the first extensions 72 and the second extensions 81. A second set of the teeth 66 is disposed on the central apex 70 in a position directed toward the lower arm 55, wherein each of the first extensions 72 and second extensions 81 are directed toward each other at an approximate 45-degree angle of the respective central apex 70 and arm center apex 79, wherein each of the teeth 66 of the first set of the teeth 66 of each of the first extensions 72 and second extensions 81 are directed toward a vertical midline axis between the central apex 70 and the arm center apex 79. Each of the teeth 66 of the second set of the teeth 66 are directed toward the arm center apex 79.

A support brace 39 is disposed between the lower horizontal member 20 and the upright member 26 proximal the outside end 24. The support brace 39 comprises an upper end 41 spaced apart from a lower end 43. The upper end 41 is disposed on the rear member side 30 proximal a center of the upright member 26. The lower end 43 is disposed on the lower horizontal member 20. The support brace 39 is at an approximate 45 degree angle to the rear member side 30. An upper brace 87 is disposed between the upright member 26 and the lower arm 55.

What is claimed is:

1. A log vice comprising:
a hollow lower horizontal member having an inside end spaced apart from an outside end, and a top side;
an upright member perpendicularly disposed on the outside end, the upright member having an internal cavity;
a continuous outer wall of the upright member, the outer wall having a rear member side spaced apart from a front member side, a top member side spaced apart from a bottom side, and a left side spaced apart from a right side;
an upper support member having a first end spaced apart from a second end, the upper support member slidably engaging the internal cavity through the top member side of the upright member;
a plurality of spaced apart apertures disposed in each of the upper support member proximal the first end and in the rear member side proximal the top member side, the apertures disposed in the first end facing the apertures in the rear member side;
a spring loaded pin selectively securing one of the apertures in the first end to one of the apertures in the rear member side;
an upper arm having a proximal end spaced apart from a distal end, the proximal end affixed perpendicularly to the second end;
a lower arm having an internal end spaced apart from an external end, the lower arm substantially perpendicularly and disposed on the front member side in a position parallel to the upper arm; the lower arm having a length greater than a length of the upper arm;
an elevated section disposed atop the lower arm at the external end;
a V-shaped upper vice arm having a central apex and a pair of first extensions, one of each first extension disposed on each of a side of the central apex, each of the first extensions angularly directed toward the lower arm;
a V-shaped lower vice arm partially comprising an arm center apex centrally disposed on the elevated section;
a pair of spaced apart second extensions disposed on each of a side of the arm center apex, the first extensions and the second extensions disposed in a mirror image configuration, wherein each of the first and second extensions are directed toward each other at an approximate 45-degree angle of the respective central apex and arm center apex; and
a plurality of teeth, a first set of the teeth being disposed on each of the first extensions and the second extensions.

2. The log vice of claim 1 further comprising:
a second set of the teeth disposed on the central apex in a position directed toward the lower arm;
wherein each of the teeth of the second set of the teeth are directed toward the arm center apex.

3. The log vice of claim 1 further comprising:
a support stand member having an upper side and a frontal side;
wherein the upright member is attachable to the upper side;
wherein the outside end is attachable to the frontal side; and
wherein each of the upright member and the lower horizontal member is separable from the support stand member.

4. The log vice of claim 2 comprising:
a support brace disposed between the lower horizontal member and the upright member proximal the outside end; and
an upper brace disposed between the upright member and the lower arm.

5. The log vice of claim 3 wherein a second set of the teeth is disposed on the central apex in a position directed toward the lower arm.

6. The log vice of claim 3 comprising a support brace disposed between the lower horizontal member and the upright member proximal the outside end;
wherein the support brace is separable from the lower horizontal member.

7. The log vice of claim 4 wherein a second set of the teeth is disposed on the central apex in a position directed toward the lower arm.

8. The log vice of claim 4 comprising:
wherein the support brace is separable from the lower horizontal member.

9. The log vice of claim 4 comprising:
a vertical post disposed on the upper side support stand member;
a horizontal post disposed on the frontal side of the support stand member;
wherein the upright member removably slidably engages the vertical post; and
wherein the lower horizontal member removably slidably engages the horizontal post.

10. The log vice of claim 9 comprising:
wherein the support brace is separable from the lower horizontal member.

11. A log vice comprising:
a hollow lower horizontal member having an inside end spaced apart from an outside end, and a top side;
an upright member disposed on the lower horizontal member, the upright member having an internal cavity;
a continuous outer wall of the upright member, the outer wall having a rear member side spaced apart from a front member side, a top member side spaced apart from a bottom side, and a left side spaced apart from a right side;
an upper support member having a first end spaced apart from a second end, the upper support member slidably engaging the internal cavity through the top member side of the upright member;
a plurality of spaced apart apertures, a first set of the apertures disposed in each of the upper support member proximal the first end and in the rear member side proximal the top member side, the apertures disposed in the first end facing the apertures in the rear member side;
a spring loaded pin selectively securing one of the apertures in the first end to one of the apertures in the rear member side;
an upper arm having a proximal end spaced apart from a distal end, the proximal end affixed perpendicularly to the second end;
a lower arm having an internal end spaced apart from an external end, the lower arm substantially perpendicularly and disposed on the front member side in a position parallel to the upper arm; the lower arm having a length greater than a length of the upper arm;
an elevated section disposed atop the lower arm at the external end;
a V-shaped upper vice arm having a central apex and a pair of first extensions, one of each first extension disposed on each of a side of the central apex, each of the first extensions angularly directed toward the lower arm;
a V-shaped lower vice arm partially comprising an arm center apex centrally disposed on the elevated section;
a pair of spaced apart second extensions disposed on each of a side of the arm center apex, the first extensions and the second extensions disposed in a mirror image configuration, wherein each of the first and second extensions are directed toward each other at an approximate 45-degree angle of the respective central apex and arm center apex;
a plurality of teeth, a first set of the teeth disposed on each of the first extensions and the second extensions, a second set of the teeth disposed on the central apex in a position directed toward the lower arm, wherein each of the first and second extensions are directed toward each other at an approximate 45-degree angle the respective central apex and arm center apex, wherein each of the teeth of the first set of the teeth of each of the first and second extensions is directed toward a vertical midline axis between the central apex and the arm center apex, wherein each of the teeth of the second set of the teeth is directed toward the arm center apex;
a support stand member having an upper side and a frontal side;
a support brace disposed between the lower horizontal member and the upright member proximal the outside end;
an upper brace disposed between the upright member and the lower arm;
a vertical post disposed on the upper side support stand member;
a horizontal post disposed on the frontal side of the support stand member;
a right angle member disposed on each of a pair of stand ends of the support stand member and on the inside end of the lower horizontal member;
a second set of the apertures wherein one of the apertures of the second set of apertures is disposed in each right angle member;
a plate disposed on a lower end of the support brace;
a fastener securing the plate to the top side;
wherein the outside end is separable from the upright member;
wherein the upright member is attachable to the upper side;
wherein the outside end is attachable to the frontal side;
wherein each of the upright member and the lower horizontal member is separable from the support stand member;
wherein the upright member removably slidably engages the vertical post;
wherein the lower horizontal member removably slidably engages the horizontal post.

12. The log vice of claim 11 wherein the lower horizontal member has a length longer than a length of each of the upper arm and the lower arm.

13. A log vice comprising:
a hollow lower horizontal member having an inside end spaced apart from an outside end, and a top side;
an upright member disposed on the outside end, the upright member having an internal cavity;
a continuous outer wall of the upright member, the outer wall having a rear member side spaced apart from a front member side, a top member side spaced apart from a bottom side, and a left side spaced apart from a right side;
an upper support member having a first end spaced apart from a second end, the upper support member slidably engaging the internal cavity through the top member side of the upright member;
a plurality of spaced apart apertures, a first set of the apertures disposed in each of the upper support member proximal the first end and in the rear member side proximal the top member side, the apertures disposed in the first end facing the apertures in the rear member side;
a spring loaded pin selectively securing one of the apertures in the first end to one of the apertures in the rear member side;
an upper arm having a proximal end spaced apart from a distal end, the proximal end affixed perpendicularly to the second end;
a lower arm having an internal end spaced apart from an external end, the lower arm substantially perpendicularly and disposed on the front member side in a position parallel to the upper arm; the lower arm having a length greater than a length of the upper arm;

an elevated section disposed atop the lower arm at the external end;

a V-shaped upper vice arm having a central apex and a pair of first extensions, one of each first extension disposed on each of a side of the central apex, each of the first extensions angularly directed toward the lower arm;

a V-shaped lower vice arm partially comprising an arm center apex centrally disposed on the elevated section;

a pair of spaced apart second extensions disposed on each of a side of the arm center apex, the first extensions and the second extensions disposed in a mirror image configuration, wherein each of the first and second extensions are directed toward each other at an approximate 45-degree angle of the respective central apex and arm center apex;

a plurality of teeth, a first set of the teeth disposed on each of the first extensions and the second extensions, a second set of the teeth disposed on the central apex in a position directed toward the lower arm, wherein each of the first and second extensions are directed toward each other at an approximate 45-degree angle the respective central apex and arm center apex, wherein each of the teeth of the first set of the teeth of each of the first and second extensions are directed toward a vertical midline axis between the central apex and the arm center apex, wherein each of the teeth of the second set of the teeth are directed toward the arm center apex; and a support brace disposed between the lower horizontal member and the upright member proximal the outside end, the support brace comprising an upper end spaced apart from a lower end, the upper end disposed on the rear member side proximal a center of the upright member, the support brace at an approximate 45 degree angle to the rear member side.

* * * * *